US 7,225,439 B2

(12) United States Patent
Garthwaite

(10) Patent No.: US 7,225,439 B2
(45) Date of Patent: May 29, 2007

(54) COMBINING WRITE-BARRIERS WITHIN AN INNER LOOP WITH FIXED STEP

(75) Inventor: Alexander T. Garthwaite, Beverly, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 712 days.

(21) Appl. No.: 10/394,812

(22) Filed: Mar. 21, 2003

(65) Prior Publication Data

US 2004/0187102 A1 Sep. 23, 2004

(51) Int. Cl.
*G06F 9/45* (2006.01)
*G06F 9/44* (2006.01)

(52) U.S. Cl. .................. 717/150; 717/106; 717/140; 707/206

(58) Field of Classification Search ........ 717/140–161, 717/106; 707/206
See application file for complete search history.

(56) References Cited

U.S. PATENT DOCUMENTS

| | | | |
|---|---|---|---|
| 5,920,876 A | | 7/1999 | Ungar et al. |
| 6,115,782 A | * | 9/2000 | Wolczko et al. ............. 711/100 |
| 6,148,310 A | | 11/2000 | Azagury et al. |
| 6,173,294 B1 | | 1/2001 | Azagury et al. |
| 6,185,581 B1 | | 2/2001 | Garthwaite |
| 6,192,517 B1 | * | 2/2001 | Agesen et al. ............... 717/154 |
| 6,226,653 B1 | | 5/2001 | Alpern et al. |
| 6,243,720 B1 | | 6/2001 | Munter et al. |
| 6,289,358 B1 | * | 9/2001 | Mattis et al. ............... 707/203 |
| 6,308,185 B1 | | 10/2001 | Grarup et al. |
| 6,363,403 B1 | | 3/2002 | Roy et al. |
| 6,381,738 B1 | | 4/2002 | Choi et al. |
| 6,424,977 B1 | | 7/2002 | Garthwaite |
| 6,453,466 B1 | | 9/2002 | Eidt et al. |
| 6,457,019 B1 | | 9/2002 | Sexton et al. |
| 6,490,599 B2 | | 12/2002 | Kolodner et al. |
| 6,804,762 B1 | * | 10/2004 | Dussud et al. ............... 711/170 |
| 6,826,757 B2 | | 11/2004 | Steele et al. |
| 6,845,437 B2 | | 1/2005 | Borman et al. |
| 6,868,488 B2 | | 3/2005 | Garthwaite |
| 6,925,637 B2 | * | 8/2005 | Thomas et al. ............. 717/151 |

(Continued)

OTHER PUBLICATIONS

Howden, Weak Mutation Testing and Completeness of Test Sets, IEEE, vol. SE-8 Issue: 4 Jul. 1982 pp. 371-379.*

(Continued)

*Primary Examiner*—Ted T. Vo
*Assistant Examiner*—Satish S. Rampuria
(74) *Attorney, Agent, or Firm*—Osha Liang LLP

(57) ABSTRACT

The present invention provides a technique for reducing the number of write barriers executed in mutator code without compromising garbage collector performance. To that end, when mutator instructions located within an inner-most nested loop ("inner loop") modify references stored in one or more arrays, a compiler defers emitting write barriers corresponding to the reference modifications until after the inner loop is emitted. By deferring emission of write barriers, the mutator may execute a write barrier for each card spanned by the array instead of executing a typically larger number of write barriers corresponding to each reference modification made in an array. Thus, the invention enables the compiler to reduce the amount of write-barrier overhead performed by the mutator, consequently enabling the mutator to execute faster and more efficiently.

7 Claims, 14 Drawing Sheets

U.S. PATENT DOCUMENTS

| | | | |
|---|---|---|---|
| 6,978,448 B1 * | 12/2005 | Plummer et al. | 717/140 |
| 2002/0138506 A1 * | 9/2002 | Shuf et al. | 707/206 |
| 2002/0138507 A1 * | 9/2002 | Shuf et al. | 707/206 |
| 2003/0033498 A1 * | 2/2003 | Borman et al. | 711/206 |
| 2003/0208500 A1 * | 11/2003 | Daynes et al. | 707/100 |
| 2004/0003014 A1 | 1/2004 | Nagarajan et al. | |

OTHER PUBLICATIONS

Zeil, Testing for Perturbations of Program Statements, IEEE, vol. SE-9 Issue: 3 May 1983 pp. 335-346.*

Gourlay, A Mathematical Framework for the Investigation of Testing, IEEE, vol. SE-9 Issue: 6 Nov. 1983 pp. 686-709.*

Richard Jones, et al., Garbage Collection: Algorithms for Automatic Dynamic Memory Management, 1996, John Wiliey & Sons Ltd., England.

Steffen Grarup, et al., Incremental Mature Garbage Collection: M.Sc. Thesis, Aug. 1993, Aarhus Univerisity, Computer Science Department, Denmark.

Paul R. Wilson, Uniprocessor Garbage Collection Techniques [Submitted to ACM Computing Surveys], pp. 1-67.

Richard L. Hudson, et al., Incremental Collection of Mature Objects, University Computing Services, University of Massachusetts, Amherst, Massachusetts.

Jacob Seligmann, et al., Incremental Mature Garbage Collection Using the Train Algorithm, Computer Science Department, Aarhus University, Denmark.

Antony L. Hosking, et al., Protection Traps and Alternatives for Memory Management of an Object-Oriented Language, pp. 1-14, Object Systems Labratory, Department of Computer Science, University of Massachusetts, Amherst, Massachusetts.

Antony L. Hosking, et al., A Comparative Performance Evaluation of Write Barrier Implementations, pp. 92-107, Object Systems Labratory, Department of Computer Science, University of Massachusetts, Amherst, Massachusetts.

Henry Lieberman, et al., A Real-Time Garbage Collector Based on the Lifetimes of Objects, 1983, MIT Artificial Intelligence Labratory.

Andrew W. Appel, Simple Generational Garbage Collection and Fast Allocation, Mar. 1988, revised Sep. 1988, Department of Computer Science, Princeton University, Princeton, New Jersey.

Richard Hudson, et al., Adaptive Garbage Collection for Modula-3 and Smalltalk, Oct. 27, 1990, pp. 1-5, Object Oriented Systems Laboratory, Department of Computer and Information Science, University of Massachusetts, Amherst, Massachusetts.

Antony L. Hosking, Remembered Sets Can Also Play Cards, pp. 1-8, Object Systems Laboratory, Department of Computer Science, University of Massachusetts, Amherst, Massachusetts.

Patrick G. Sobalvarro, A Lifetime-Based Garbage Collector for LISP Systems on General-Purpose Computers, Sep. 1988, pp. 1-59, Department of Electrical Engineering and Computer Science at the Massachusetts Institute of Technology.

Pekka P. Pirinen, Barrier Techniques for Incremental Tracing, pp. 20-25, Harlequin Limited, Barrington Hall, Barrington, Cambridge CB2 5 RG, UK.

P. T. Withington, How Real is "Real-Time" GC?, Oct. 6, 1991, Symbolics, Inc., Burlington, Massachusetts.

Urs Holzle, A Fast Write Barrier for Generational Garbage Collectors, Oct. 1993, pp. 1-6, Computer Systems Laboratory, Stanford University, California.

Benjamin Zorn, Barrier Methods for Garbage Collection, Nov. 1990, pp. 1-37, Department of Computer Science, University of Colorado at Boulder, Boulder, Colorado.

Richard L. Hudson et al., Sapphire: Copying GC Without Stopping the World, Concurrency and Computation: Practice and Experience Special Issue: Java Grande/ISCOPE.

Scott Nettles, et al., Real-Time Replication Garbage Collection, Avionics Lab, Wright research and Development Center, Aeronautical Systems Division (AFSC), U.S. Air Force, Wright Patterson AFB, Ohio.

Appel, et al., "Real-Time Concurrent Collection on Stock Multiprocessors", ACM SIGPLAN Notices, 1988.

Bacon, et al., "Java without the Coffee Breaks: A nonintrusive Multiprocessor Garbage Collector", SIGPLAN Conference on Programming Language Design and Implementation, Jun. 2001, Snowbird, UT.

Baker, "List Processing in Real Time on a Serial Computer", Communications of the ACM 21, Apr. 1978, 280-294.

Brooks, "Trading Data Space for Reduced Time and Code Space in Real-Time Garbage Collection on Stock Hardware", Proceedings of the 1984 Acm Symposium on Lisp and Funcional Programming, Aug. 1984, 108-113, Austin, TX.

Chilimbi, et al., "Using Generational Garbage Collection to Implement Cache-Conscious Data Placement", International Symposium on Memory Management, Oct. 1998.

Clark, et al., "Compacting Garbage Collection can be Fast and Simple", Software-Practice and Experience, vol. 26, No. 2, Feb. 1996, 177-194.

Courts, "Improving Locality of Reference in a Garbage-Collecting Memory Management System", Communications of the ACM, vol. 31, No. 9, Sep. 1988, 1128-1138.

Herlihy, et al., "Lock-Free Garbage Collection for Multiprocessors", ACM SPAA, 1991, 229-236.

Moon, "Garbage Collection in a Large Lisp System", Conference Record of the 1984 ACM Symposium on LISP and Functional Programming, Aug. 1984, 235-246, Austin, TX.

Stamos, "Static Grouping of Small Objects to Enhance Performance of a Paged Virtual Memory", ACM Transactions on Computer Systems, vol. 2, No. 2, May 1984, 155-180.

Ungar, "Generation Scavenging: A Non-Disruptive High Performance Storage Reclaration Algorithm", ACM SIGPLAN Notices, Apr. 1984, 19(5).

Lam, et al., "Object Type Directed Garbage Collection to Improve Locality", Proceedings of the International Workshop on Memory Management, Sep. 1992, 404-425, St. Malo, France.

Wilson, et al., "Effective Static-Graph Reorganization to Improve Locality in Garbage Collected Systems", Proceedings of ACM SIGPLAN Conference on Programming Language Design and Implementation, Jun. 1991, Canada.

Detlefs, et al., "Concurrent Remembered Set Refinement in Generational Garbage Collection", Proceedings of the USENIX Java VM '02 Conference, Aug. 1-2, 2002, 14 pages, San Francisco, CA, USA.

* cited by examiner

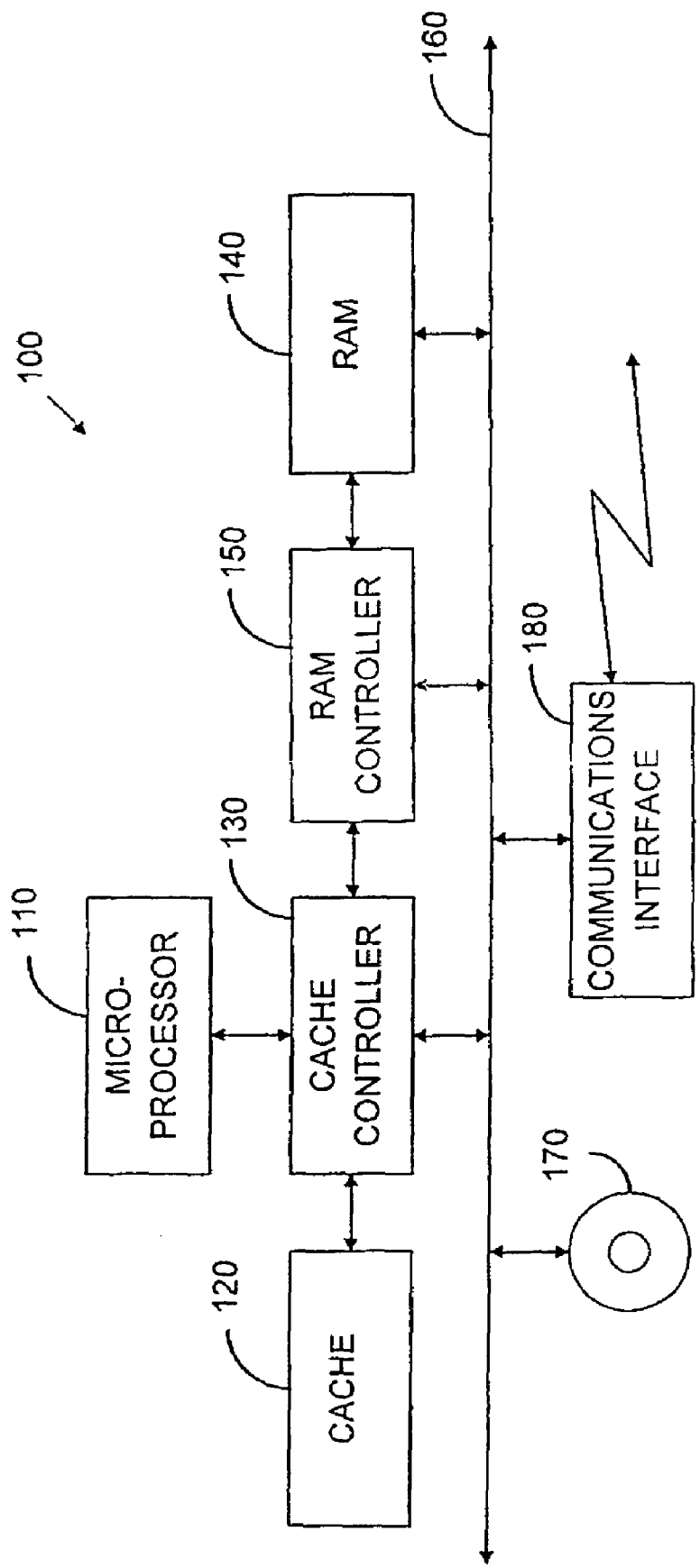
FIG. 1 - Prior Art

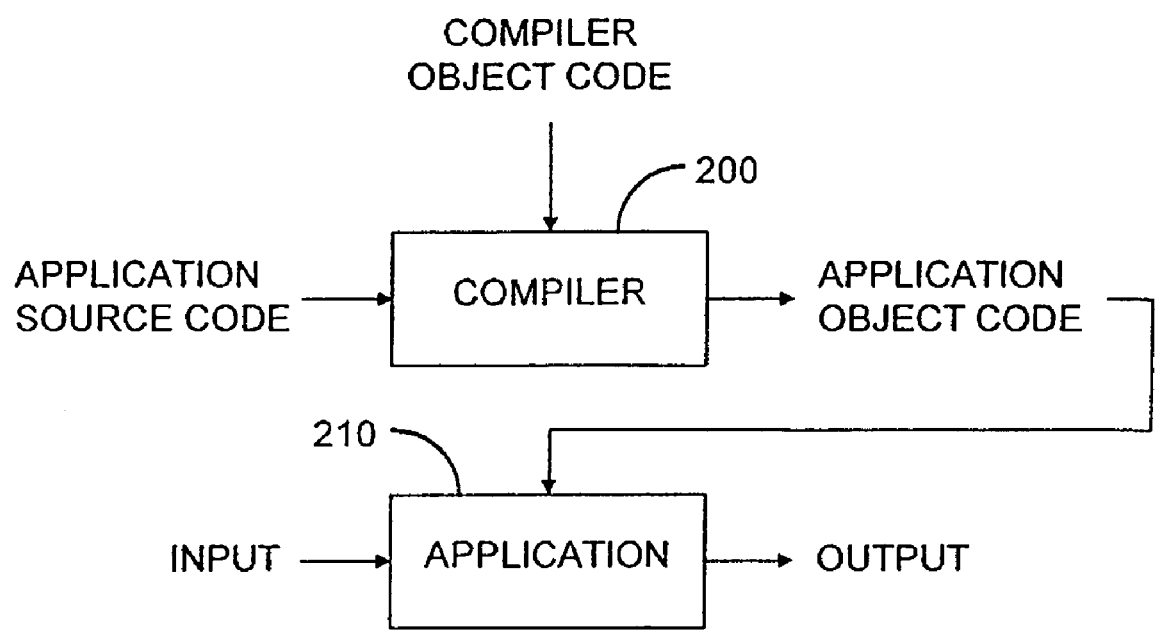
FIG. 2- Prior Art

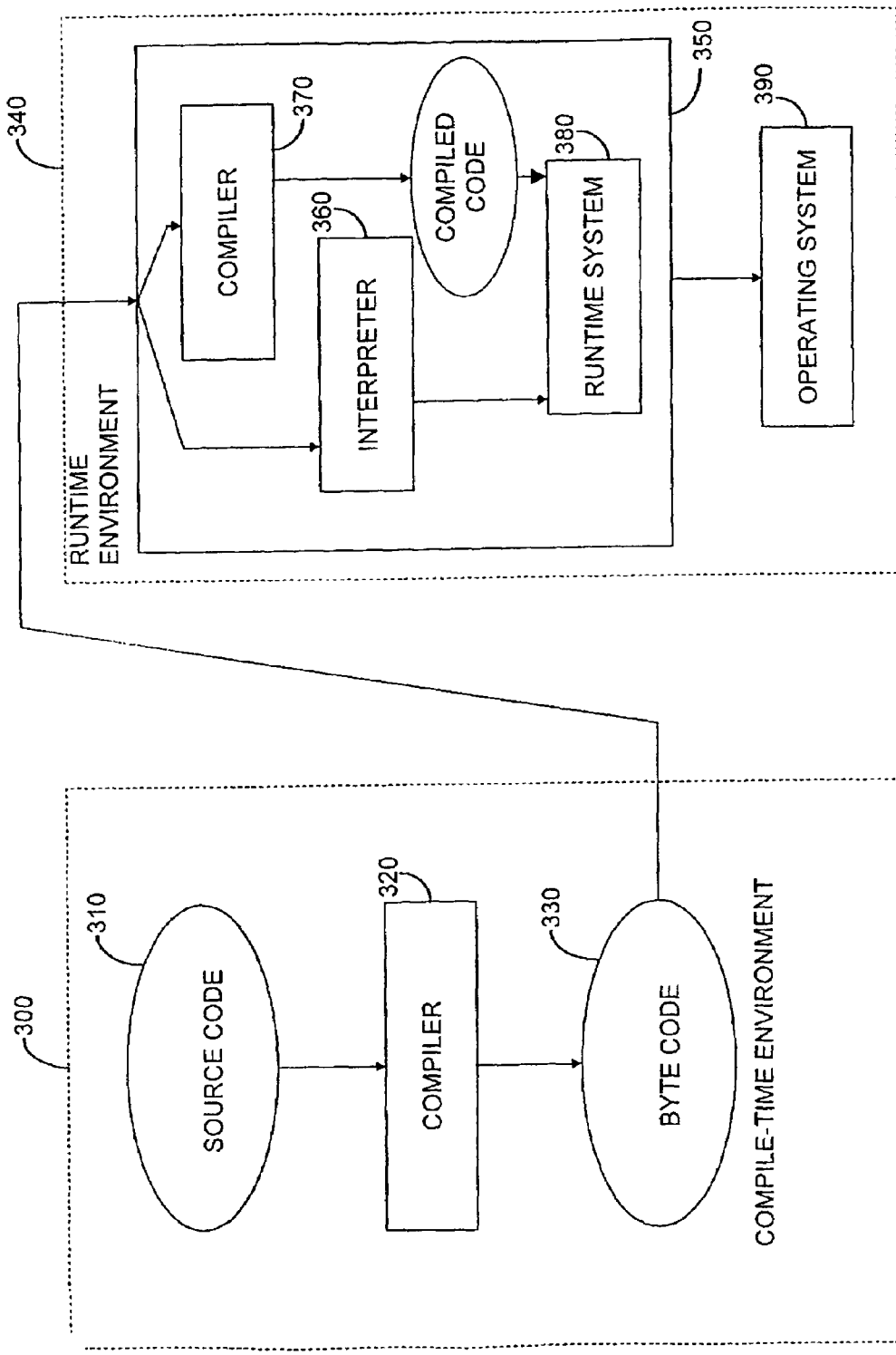
FIG. 3 - Prior Art

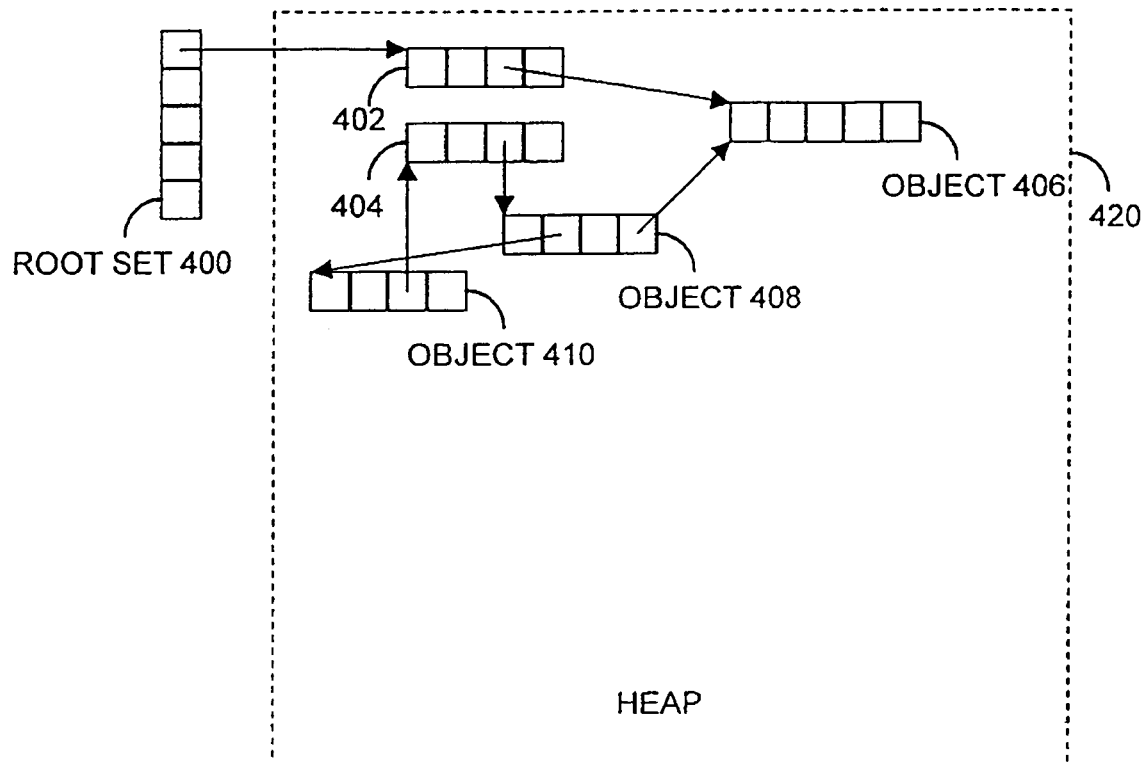
FIG. 4- Prior Art
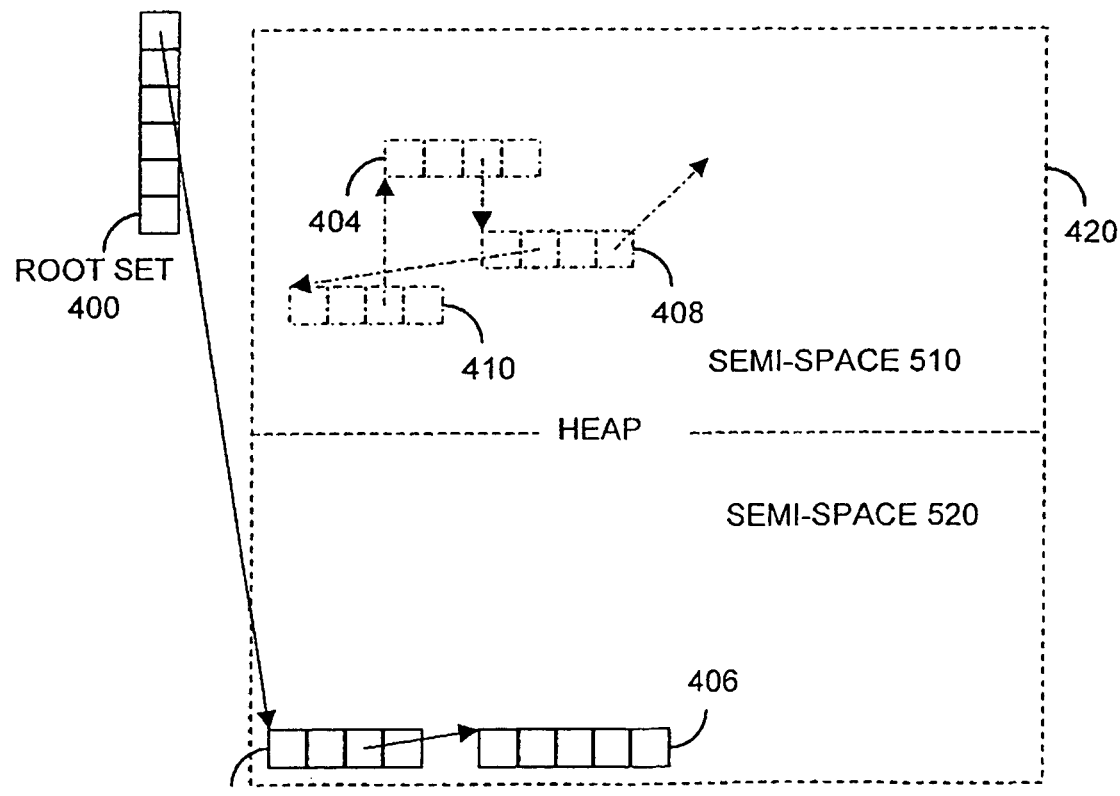
FIG. 5- Prior Art

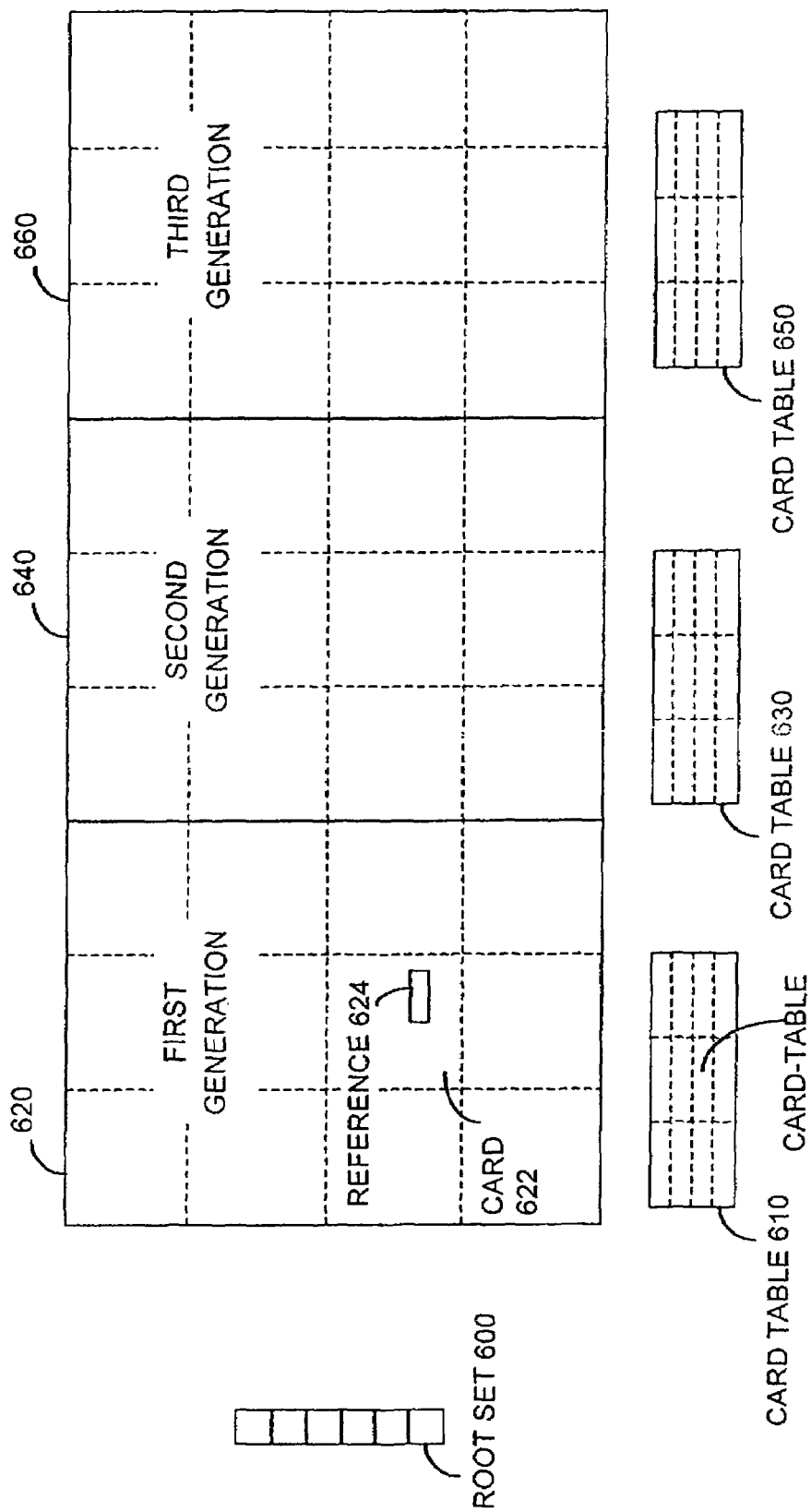
FIG. 6 - Prior Art

```
1   /* Mature Object O is modified by a write operation */
2   /* Register_1 stores O's starting address*/
3   /* Register_2 stores a value that will modify O*/
4   /* Register_3 stores the base address of a card table*/
5   /* Register_4 is a "working" register*/
6   /*Log_card_size is a base_2 log card size*/
7   /* C is the offset of the field modified in O*/
8   /* Mutator code begins */
              ⋮

N     /* Object is modified in a mutator code*/
N+1         STW Register_2, (Register_1 + C)
N +2  /* Write barrier code */
N +3        ADD Register_1, C, Register_4
N +4        SRL Register_4, log_card_size, Register_4
N +5        STB 0, (Register_3 + Register_4)
N +6  /* Mutator code continues */
              ⋮
```

FIG. 7- Prior Art

```
for(int j=0, j<10, j++){         ⸺ 800
            •
            •
            •
    for(int i=0, i<N, j++){      ⸺ 810
        a[i]=b[i];
                    812
            •
            •
            •
    }
            •
            •
            •
}
```

FIG. 8

```
1     /* Mutator m                                                          */
2     /* Register_len stores the length of array a[]                        */
3     /* Register_i stores the value of a loop index i                      */
4     /* Register_a stores the starting address of the array a[]            */
5     /* Register_b stores the starting address of an array b[]             */
6     /* Register_ct stores the base address of a card table                */
7     /* Register_w is a "working" register                                 */
8     /* Log_card_size is a base_2 log of the card size C                   */
9     /* Slot_i is a stack-frame slot that stores an initial loop-index value */
10    /* Mutator code begins                                                */
                    .
                    .
                    .
N         /* Initialize loop index for inner loop to equal zero */
N+1              SETHI  %HI (0x0), register_i
N+2              STW    register_i, slot_i
N+3   INNER_LOOP:
N+4       /* a[i] = b[i]; */
N+5              STW    (register_b + register_i), (register_a + register_i)
N+6       /* i++ */
N+7              ADD    register_i, 1, register_i
N+8       /* Backwards branch if loop index does not equal */
N+9       /* length of array a[] */
N+10             SUBCC  register_i, register_len, 0
N+11             BNE    INNER_LOOP
N+12             NOP
N+13      /* Load initial loop-index value for use in write-barrier loop */
N+14             LOAD   slot_i, register_i
N+15  WRITE_BARRIER_LOOP:
N+16      /* Write-barrier code to mark cards spanned by array a[] */
N+17             ADD    register_a, register_i, register_w
N+18             SRL    register_w, log_card_size, register_w
N+19             STB    0, (register_ct + register_w)
N+20      /* Increment loop index by length of a card */
N+21             ADD    register_i, C, register_i
```

FIG. 9A

| | |
|---|---|
| N+22 | /* Backwards branch if loop index value is less than */ |
| N+23 | /* the length of array a[] */ |
| N+24 | SUBCC register_i, register_len, 0 |
| N+25 | BNEG WRITE_BARRIER_LOOP |
| N+26 | NOP |
| N+27 | /* Write-barrier code to mark last element of array a[] */ |
| N+28 | ADD register_a, register_len, register_w |
| N+29 | SRL register_w, log_card_size, register_w |
| N+30 | STB 0, (register_ct + register_w) |

FIG. 9B

```
1    /* Mutator m                                                            */
2    /* Register_o stores the memory location of a newly allocated object    */
3    /* Register_len stores the length of arrays a[] and b[]                 */
4    /* Register_i stores the value of a loop index i                        */
5    /* Register_a stores the starting address of the array a[]              */
6    /* Register_b stores the starting address of an array b[]               */
7    /* Register_ct stores the base address of a card table                  */
8    /* Register_w is a "working" register                                   */
9    /* Slot_i is a stack-frame slot that stores an initial loop-index value */
10   /* Log_card_size is a base_2 log of the card size C                     */
11   /* Mutator code begins */
                    •
                    •
                    •
N               /* Initialize loop index for inner loop to equal zero */
N+1                 SETHI %HI (0x0), register_i
N+2                 STW   register_i, slot_i
N+3  INNER_LOOP:
N+4             /* a[i] = new Object(); */
N+5                 CALL newInstance_object
N+6                 STW register_o, (register_a + register_i)
N+7             /* b[i] = new Object(); */
N+8                 CALL newInstance_object
N+9                 STW register_o, (register_b + register_i)
N+10            /* i++ */
N+11                ADD register_i, 1, register_i
N+12            /* Backwards branch if loop index does not equal */
N+13            /* length of arrays a[] and b[] */
N+14                SUBCC register_i, register_len, 0
N+15                BNE   INNER_LOOP
N+16                NOP
N+17            /* Loop initial loop-index value for use in write-barrier loop */
N+18                LOAD  slot_i, register_i
N+19 WRITE_BARRIER_LOOP:
N+20            /* Write-barrier code to mark cards spanned by array a[] */
N+21                ADD register_a, register_i, register_w
N+22                SRL register_w, log_card_size, register_w
N+23                STB 0, (register_ct + register_w)
```

FIG. 11A

| | |
|---|---|
| N+24 | /* Write-barrier code to mark cards spanned by array b[] */ |
| N+25 |     ADD register_b, register_i, register_w |
| N+26 |     SRL register_w, log_card_size, register_w |
| N+27 |     STB 0, (register_ct + register_w) |
| N+28 | /* Increment loop index by length of a card */ |
| N+29 |     ADD register_i, C, register_i |
| N+30 | /* Backwards branch if loop index value is less than */ |
| N+31 | /* the length of arrays a[] and b[] */ |
| N+32 |     SUBCC register_i, register_len, 0 |
| N+33 |     BNEG    WRITE_BARRIER_LOOP |
| N+34 |     NOP |
| N+35 | /* Write-barrier code to mark last element of array a[] */ |
| N+36 |     ADD register_a, register_len, register_w |
| N+37 |     SRL register_w, log_card_size, register_w |
| N+38 |     STB 0, (register_ct + register_w) |
| N+39 | /* Write-barrier code to mark last element of array b[] */ |
| N+40 |     ADD register_b, register_len, register_w |
| N+41 |     SRL register_w, log_card_size, register_w |
| N+42 |     STB 0, (register_ct + register_w) |

FIG. 11B

COMBINING WRITE-BARRIERS WITHIN AN INNER LOOP WITH FIXED STEP

FIELD OF THE INVENTION

The present invention is directed to memory management. It particularly concerns what has come to be known as "garbage collection."

BACKGROUND OF THE INVENTION

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. They also may belong to a class, which is an organizational entity that may contain method code or other information shared by all objects belonging to that class. In the discussion that follows, though, the term object will not be limited to such structures; it will additionally include structures with which methods and classes are not associated.

The invention to be described below is applicable to systems that allocate memory to objects dynamically. Not all systems employ dynamic allocation. In some computer languages, source programs can be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 100 depicted in FIG. 1, for example. Data, and instructions for operating on them, that a microprocessor 110 uses may reside in on-board cache memory or be received from further cache memory 120, possibly through the mediation of a cache controller 130. That controller 130 can in turn receive such data from system read/write memory ("RAM") 140 through a RAM controller 150 or from various peripheral devices through a system bus 160. Additionally, instructions and data may be received from other computer systems via a communication interface 180. The memory space made available to an application program may be "virtual" in the sense that it may actually be considerably larger than RAM 140 provides. So the RAM contents will be swapped to and from a system disk 170.

Additionally, the actual physical operations performed to access some of the most-recently visited parts of the process's address space often will actually be performed in the cache 120 or in a cache on board microprocessor 110 rather than on the RAM 140, with which those caches swap data and instructions just as RAM 140 and system disk 170 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

The use of static memory allocation in writing certain long-lived applications makes it difficult to restrict storage requirements to the available memory space. Abiding by space limitations is easier when the platform provides for dynamic memory allocation, i.e., when memory space to be allocated to a given object is determined only at run time.

Dynamic allocation has a number of advantages, among which is that the run-time system is able to adapt allocation to run-time conditions. For example, the programmer can specify that space should be allocated for a given object only in response to a particular run-time condition. The C-language library function malloc( ) is often used for this purpose. Conversely, the programmer can specify conditions under which memory previously allocated to a given object can be reclaimed for reuse. The C-language library function free( ) results in such memory reclamation. Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory-or, worse, loses track of the address of a dynamically allocated segment of memory-its memory requirements will grow over time to exceed the system's available memory. This kind of error is known as a "memory leak." Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference."

A way of reducing the likelihood of such leaks and related errors is to provide memory-space reclamation in a more automatic manner. Techniques used by systems that reclaim memory space automatically are commonly referred to as garbage collection. Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable. As used herein, a call stack is a data structure that corresponds to a process or thread and stores state information, such as local variables, register contents and program counter values, associated with nested routines within the process or thread. A call stack is usually thought of as divided into stack frames associated with respective calls of the nested routines.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a root set, e.g., global variables, registers, and the call stack, automatic garbage collectors obtain global knowledge in a methodical way. By using a garbage collector, the programmer is relieved of the need to worry about the application's global state and can concentrate on local-state issues, which are more manageable. The result is applications that are more robust, having no dangling references and fewer memory leaks.

Garbage collection mechanisms can be implemented by various parts and levels of a computing system. One approach is simply to provide them as part of a batch compiler's output. Consider FIG. 2's simple batch-compiler operation, for example. A computer system executes in accordance with compiler object code and therefore acts as a compiler 200. The compiler object code is typically stored on a medium such as FIG. 1's system disk 170 or some other machine-readable medium, and it is loaded into RAM 140 to configure the computer system to act as a compiler. In some cases, though, the compiler object code's persistent storage may instead be provided in a server system remote from the machine that performs the compiling. The electrical signals that carry the digital data by which the computer systems exchange that code are examples of the kinds of electromagnetic signals by which the computer instructions can be communicated. Others include radio waves, microwaves, and both visible and invisible light.

The input to the compiler is the application source code, and the end product of the compiler process is application object code. This object code defines an application 210, which typically operates on input such as mouse clicks, etc., to generate a display or some other type of output. This object code implements the relationship that the programmer intends to specify by his application source code. In one approach to garbage collection, the compiler 200, without the programmer's explicit direction, additionally generates code that automatically reclaims unreachable memory space.

Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage collection mechanism over a number of computer system layers.

To get some sense of the variety of system components that can be used to implement garbage collection, consider FIG. 3's example of a more complex way in which various levels of source code can result in the machine instructions that a processor executes. In the FIG. 3 arrangement, the human applications programmer produces source code 310 written in a high-level language. A compiler 320 typically converts that code into "class files." These files include routines written in instructions, called "byte codes" 330, for a "virtual machine" that various processors can be configured to emulate. This conversion into byte codes is almost always separated in time from those codes' execution, so FIG. 3 divides the sequence into a "compile-time environment" 300 separate from a "run-time environment" 340, in which execution occurs. One example of a high-level language for which compilers are available to produce such virtual-machine instructions is the Java™ programming language. (Java is a trademark or registered trademark of Sun Microsystems, Inc., in the United States and other countries.)

Most typically, the class files' byte-code routines are executed by a processor under control of a virtual-machine process 350. That process emulates a virtual machine from whose instruction set the byte codes are drawn. As is true of the compiler 320, the virtual-machine process 350 may be specified by code stored on a local disk or some other machine-readable medium from which it is read into FIG. 1's RAM 140 to configure the computer system to implement the garbage collector and otherwise act as a virtual machine. Again, though, that code's persistent storage may instead be provided by a server system remote from the processor that implements the virtual machine, in which case the code would be transmitted, e.g., electrically or optically to the virtual-machine-implementing processor.

In some implementations, much of the virtual machine's action in executing these byte codes is most like what those skilled in the art refer to as "interpreting," so FIG. 3 depicts the virtual machine as including an "interpreter" 360 for that purpose. In addition to or instead of running an interpreter, many virtual-machine implementations actually compile the byte codes concurrently with the resultant object code's execution, so FIG. 3 depicts the virtual machine as additionally including a "just-in-time" compiler 370. The arrangement of FIG. 3 differs from FIG. 2 in that the compiler 320 for converting the human programmer's code does not contribute to providing the garbage collection function; that results largely from the virtual machine 350's operation.

Those skilled in that art will recognize that both of these organizations are merely exemplary, and many modern systems employ hybrid mechanisms, which partake of the characteristics of traditional compilers and traditional interpreters both. The invention to be described below is applicable independently of whether a batch compiler, a just-in-time compiler, an interpreter, or some hybrid is employed to process source code. In the remainder of this application, therefore, we will use the term compiler to refer to any such mechanism, even if it is what would more typically be called an interpreter.

Now, some of the functionality that source-language constructs specify can be quite complicated, requiring many machine-language instructions for their implementation. One quite-common example is a source-language instruction that calls for 64-bit arithmetic on a 32-bit machine. More germane to the present invention is the operation of dynamically allocating space to a new object; this may require determining whether enough free memory space is available to contain the new object and reclaiming space if there is not.

In such situations, the compiler may produce "inline" code to accomplish these operations. That is, all object-code instructions for carrying out a given source-code-prescribed operation will be repeated each time the source code calls for the operation. But inlining runs the risk that "code bloat" will result if the operation is invoked at many source-code locations.

The natural way of avoiding this result is instead to provide the operation's implementation as a procedure, i.e., a single code sequence that can be called from any location in the program. In the case of compilers, a collection of procedures for implementing many types of source-code-specified operations is called a runtime system for the language. The compiler and its runtime system are designed together so that the compiler "knows" what runtime-system procedures are available in the target computer system and can cause desired operations simply by including calls to procedures that the target system already contains. To represent this fact, FIG. 3 includes block 380 to show that the compiler's output makes calls to the runtime system as well as to the operating system 390, which consists of procedures that are similarly system resident but are not compiler-dependent.

Although the FIG. 3 arrangement is a popular one, it is by no means universal, and many further implementation types can be expected. Proposals have even been made to implement the virtual machine 350's behavior in a hardware processor, in which case the hardware itself would provide some or all of the garbage collection function. In short, garbage collectors can be implemented in a wide range of combinations of hardware and/or software.

By implementing garbage collection, a computer system can greatly reduce the occurrence of memory leaks and other software deficiencies in which human programming frequently results. But it can also have significant adverse performance effects if it is not implemented carefully. To distinguish the part of the program that does "useful" work from that which does the garbage collection, the term mutator is sometimes used in discussions of these effects; from the collector's point of view, what the mutator does is mutate active data structures' connectivity.

Some garbage collection approaches rely heavily on interleaving garbage collection steps among mutator steps. In one type of garbage collection approach, for instance, the mutator operation of writing a reference is followed immediately by garbage collector steps used to maintain a reference count in that object's header, and code for subsequent new-object storage includes steps for finding space occupied by objects whose reference count has fallen to zero. Obviously, such an approach can slow mutator operation significantly.

Other approaches therefore interleave very few garbage collector-related instructions into the main mutator process but instead interrupt it from time to time to perform garbage collection intervals, in which the garbage collector finds unreachable objects and reclaims their memory space for reuse. Such an approach will be assumed in discussing FIG. 4's depiction of a simple garbage collection operation. Within the memory space allocated to a given application is a part 420 managed by automatic garbage collection. As used hereafter, all dynamically allocated memory associated with a process or thread will be referred to as its heap. During the course of the application's execution, space is allocated for various objects 402, 404, 406, 408, and 410. Typically, the mutator allocates space within the heap by invoking the garbage collector, which at some level manages access to the heap. Basically, the mutator asks the garbage collector for a pointer to a heap region where it can safely place the object's data. The garbage collector keeps track of the fact that the thus-allocated region is occupied. It will refrain from allocating that region in response to any other request until it determines that the mutator no longer needs the region allocated to that object.

Garbage collectors vary as to which objects they consider reachable and unreachable. For the present discussion, though, an object will be considered "reachable" if it is referred to, as object 402 is, by a reference in a root set 400. The root set consists of reference values stored in the mutator's threads' call stacks, the central processing unit (CPU) registers, and global variables outside the garbage collected heap. An object is also reachable if it is referred to, as object 406 is, by another reachable object (in this case, object 402). Objects that are not reachable can no longer affect the program, so it is safe to re-allocate the memory spaces that they occupy.

A typical approach to garbage collection is therefore to identify all reachable objects and reclaim any previously allocated memory that the reachable objects do not occupy. A typical garbage collector may identify reachable objects by tracing references from the root set 400. For the sake of simplicity, FIG. 4 depicts only one reference from the root set 400 into the heap 420. (Those skilled in the art will recognize that there are many ways to identify references, or at least data contents that may be references.) The collector notes that the root set points to object 402, which is therefore reachable, and that reachable object 402 points to object 406, which therefore is also reachable. But those reachable objects point to no other objects, so objects 404, 408, and 410 are all unreachable, and their memory space may be reclaimed.

To avoid excessive heap fragmentation, some garbage collectors additionally relocate reachable objects. FIG. 5 shows a typical approach for this "copying" type of garbage collection. The heap is partitioned into two halves, hereafter called "semi-spaces." For one garbage collection cycle, all objects are allocated in one semi-space 510, leaving the other semi-space 520 free. When the garbage collection cycle occurs, objects identified as reachable are "evacuated" to the other semi-space 520, so all of semi-space 510 is then considered free. Once the garbage collection cycle has occurred, all new objects are allocated in the lower semi-space 520 until yet another garbage collection cycle occurs, at which time the reachable objects are evacuated back to the upper semi-space 510.

Although this relocation requires the extra steps of copying the reachable objects and updating references to them, it tends to be quite efficient, since most new objects quickly become unreachable, so most of the current semi-space is actually garbage. That is, only a relatively few, reachable objects need to be relocated, after which the entire semi-space contains only garbage and can be pronounced free for reallocation.

Now, a collection cycle can involve following all reference chains from the basic root set—i.e., from inherently reachable locations such as the call stacks, class statics and other global variables, and registers—and reclaiming all space occupied by objects not encountered in the process. And the simplest way of performing such a cycle is to interrupt the mutator to provide a collector interval in which the entire cycle is performed before the mutator resumes. For certain types of applications, this approach to collection-cycle scheduling is acceptable and, in fact, highly efficient.

For many interactive and real-time applications, though, this approach is not acceptable. The delay in mutator operation that the collection cycle's execution causes can be annoying to a user and can prevent a real-time application from responding to its environment with the required speed. In some applications, choosing collection times opportunistically can reduce this effect. For example, a garbage-collection cycle may be performed at a natural stopping point in the application, such as when the mutator awaits user input.

So it may often be true that the garbage-collection operation's effect on performance can depend less on the total collection time than on when collections actually occur. But another factor that often is even more determinative is the duration of any single collection interval, i.e., how long the mutator must remain quiescent at any one time. In an interactive system, for instance, a user may never notice hundred-millisecond interruptions for garbage collection, whereas most users would find interruptions lasting for two seconds to be annoying.

The cycle may therefore be divided up among a plurality of collector intervals. When a collection cycle is divided up among a plurality of collection intervals, it is only after a number of intervals that the collector will have followed all reference chains and be able to identify as garbage any objects not thereby reached. This approach is more complex than completing the cycle in a single collection interval; the mutator will usually modify references between collection intervals, so the collector must repeatedly update its view of the reference graph in the midst of the collection cycle. To make such updates practical, the mutator must communicate with the collector to let it know what reference changes are made between intervals.

An even more complex approach, which some systems use to eliminate discrete pauses or maximize resource-use efficiency, is to execute the mutator and collector in concurrent execution threads. Most systems that use this approach use it for most but not all of the collection cycle; the mutator is usually interrupted for a short collector interval, in which a part of the collector cycle takes place without mutation.

Independent of whether the collection cycle is performed concurrently with mutator operation, is completed in a single interval, or extends over multiple intervals is the question of whether the cycle is complete, as has tacitly been assumed so far, or is instead "incremental." In incremental collection, a collection cycle constitutes only an increment of collection: the collector does not follow all reference chains from the basic root set completely. Instead, it concentrates on only a portion, or collection set, of the heap. Specifically, it identifies every collection-set object referred to by a reference chain that extends into the collection set from outside of it, and it reclaims the collection-set space not occupied by such objects, possibly after evacuating them from the collection set.

By thus culling objects referenced by reference chains that do not necessarily originate in the basic root set, the collector can be thought of as expanding the root set to include as roots some locations that may not be reachable. Although incremental collection thereby leaves "floating garbage," it can result in relatively low pause times even if entire collection increments are completed during respective single collection intervals.

Most collectors that employ incremental collection operate in "generations" although this is not necessary in principle. Different portions, or generations, of the heap are subject to different collection policies. New objects are allocated in a "young" generation, and older objects are "promoted" from younger generations to older or more "mature" generations. Collecting the younger generations more frequently than the others yields greater efficiency because the younger generations tend to accumulate garbage faster; newly allocated objects tend to "die," while older objects tend to "survive."

But generational collection greatly increases what is effectively the root set for a given generation. Consider FIG. 6, which depicts a heap as organized into three generations 620, 640, and 660. Assume that generation 640 is to be collected. The process for this individual generation may be more or less the same as that described in connection with FIGS. 4 and 5 for the entire heap, with one major exception. In the case of a single generation, the root set must be considered to include not only the call stack, registers, and global variables represented by set 600 but also objects in the other generations 620 and 660, which themselves may contain references to objects in generation 640. So pointers must be traced not only from the basic root set 600 but also from objects within the other generations.

One could perform this tracing by simply inspecting all references in all other generations at the beginning of every collection interval, and it turns out that this approach is actually feasible in some situations. But it takes too long in other situations, so workers in this field have employed a number of approaches to expediting reference tracing. One approach is to include so-called write barriers in the mutator process. A write barrier is code added to a write operation in the mutator code to record information from which the garbage collector can determine where references were written or may have been since the last collection interval. The write-barrier code may communicate this information directly to the collector or indirectly through other runtime processes. A list of modified references can then be maintained by taking such a list as it existed at the end of the previous collection interval and updating it by inspecting only locations identified by the write barriers as possibly modified since the last collection interval.

One of the many write-barrier implementations commonly used by workers in this art employs what has been referred to as the "card table." FIG. 6 depicts the various generations as being divided into smaller sections, known for this purpose as "cards." Card tables 610, 630, and 650 associated with respective generations contain an entry for each of their cards. When the mutator writes a reference in a card, it makes an appropriate entry in the card-table location associated with that card (or, say, with the card in which the object containing the reference begins). Most write-barrier implementations simply make a Boolean entry indicating that the write operation has been performed, although some may be more elaborate. For example, assume reference 624 on card 622 is modified ("dirtied") by the mutator, so a Boolean entry in corresponding card-table entry 605 may be set accordingly. The mutator having thus left a record of where new or modified references may be, the collector may scan the card-table to identify those cards in the mature generation that were marked as having been modified since the last collection interval, and the collector can scan only those identified cards for modified references.

Of course, there are other write-barrier approaches, such as simply having the write barrier add to a list of addresses where references were written. Also, although there is no reason in principle to favor any particular number of generations, and although FIG. 6 shows three, most generational garbage collectors have only two generations, of which one is the young generation and the other is the mature generation. Moreover, although FIG. 6 shows the generations as being of the same size, a more-typical configuration is for the young generation to be considerably smaller. Further, each generation may be dispersed over various address ranges of memory instead of comprising a contiguous block of memory as shown in FIG. 6. Finally, although we assumed for the sake of simplicity that collection during a given interval was limited to only one generation, a more-typical approach is actually to collect the whole young generation at every interval but to collect the mature one less frequently.

Some collectors collect the entire young generation in every interval and may thereafter collect the mature generation collection in the same interval. It may therefore take relatively little time to scan all young-generation objects remaining after young-generation collection to find references into the mature generation. Even when such collectors do use card tables, therefore, they often do not use them for finding young-generation references that refer to mature-generation objects. On the other hand, laboriously scanning the entire mature generation for references to young-generation (or mature-generation) objects would ordinarily take too long, so write barriers are typically used to set card-table entries associated with the mature generation to thereby limit the amount of memory the collector searches for modified mature-generation references.

Write barrier code is often inserted into mutator code in close proximity to a corresponding mutator instruction that modifies a reference. In an imprecise card-marking scheme, the write barrier code marks the card-table entry that corresponds to the card in which the modified object begins. In a precise card-marking scheme, the write barrier marks the card-table entry that corresponds to the card in which the modified field is located. FIG. 7 illustrates exemplary write barrier code for precise card-marking that corresponds to a mutator instruction that modifies a reference.

FIG. 7's line N+1 contains an assembly instruction (STW) for storing a word-length value into an object reference field located at an offset C from the object's starting address, while lines N+3 through N+5 illustrate the assembly instruction's corresponding write-barrier code. In this example, the write barrier adds three instructions not originally present in the mutator code: ADD, Shift Right Logical (SRL) and Store Byte (STB) instructions. Specifically, the instruction at line N+3 stores the address of the modified object field in a "working" register, and the instruction at line N+4 divides this address by the card size to determine how many cards into the mature generation the modified field is located. Here, we have assumed the card size is $2^M$ bytes. Lastly, the instruction at line N+5 marks a card-table entry with a binary "0" corresponding to the card in the mature generation that stores the modified object field. As described, each card-table entry is assumed to have a length of one byte.

As seen with regards to FIG. 7, the inclusion of write barriers after modifying object references increases the amount of mutator code, e.g., by three instructions per reference modification. Clearly, this overhead may significantly increase the mutator's execution time, especially when the mutator code modifies references frequently. So adding write barriers to increase the garbage collector's efficiency tends to compromise the mutator's.

SUMMARY OF THE INVENTION

The present invention provides a technique for reducing the number of write barriers executed in mutator code without compromising garbage collector performance. To that end, when an array of references spans a plurality of adjacent cards in memory, and instructions in an "inner loop" modify at least one of the array's references in each of the adjacent cards, a compiler may defer emission of write-barrier code for the reference modifications. That is, the write barriers are emitted as code that will be executed at run time after the inner loop is executed. In this context, an inner loop is a loop in the mutator code that contains no other loops having instructions that modify array-reference values. By deferring emission of the inner loop's write barriers, the compiler can configure the mutator to perform one deferred write barrier for each card spanned by the array instead of executing a typically larger number of write barriers for each reference modification made in the array, as conventionally done. Thus, the invention enables the compiler to reduce the amount of write-barrier overhead performed by the mutator, consequently enabling the mutator to execute faster and more efficiently.

At run time, a garbage collector may interrupt execution of the inner loop at a point where references in one or more arrays have been modified without execution of corresponding write barriers. To deal with this situation, the collector may be configured to locate where these unrecorded reference modifications occurred in the heap so it can be apprised of the same information it would have received had write barriers been executed. Advantageously, the collector may access one or more data structures, generated at compile time by the compiler, that indicate how and where arrays were modified before the collector interrupted the inner loop's execution. Upon identifying which arrays were modified, the collector then may identify the range of array elements that were modified without execution of corresponding write barriers.

Illustratively, the collector determines the range of modified array elements based on the value of a "current" loop index, corresponding to the loop iteration in which the collector interrupted the mutator method, and based on the value of an "initial" loop index, e.g., previously stored in a call-stack frame associated with the interrupted method. Preferably, the collector performs the same operations that it would have performed had write barriers been executed for every card spanned over the range of array elements defined by the initial index value and current index value. The collector then updates the initial loop-index value to reflect the write-barrier operations it performed.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 1, previously discussed, is a schematic block diagram of a computer system of a type in which the present invention's teachings can be practiced;

FIG. 2, previously discussed, is a schematic block diagram illustrating a simple source-code compilation operation;

FIG. 3, previously discussed, is a schematic block diagram of a more complex compiler/interpreter organization;

FIG. 4, previously discussed, is a schematic block diagram that illustrates a basic garbage collection mechanism;

FIG. 5, previously discussed, is a schematic block diagram illustrating an the relocation operation of the garbage collection mechanism of FIG. 7;

FIG. 6, previously discussed, is a schematic block diagram that illustrates a garbage collected heap's organization into generations;

FIG. 7, previously discussed, is an exemplary source code listing of a write barrier that may be used in accordance with the present invention;

FIG. 8 is an exemplary source-code representation of an inner loop nested within an outer loop;

FIGS. 9A–B are an exemplary assembly-code representation of an inner loop having deferred write barriers executed in a later write-barrier loop;

FIGS. 11A–B are an exemplary assembly-code representation of an inner loop comprising a plurality of possible safe points whose write barriers are deferred until a subsequent write-barrier loop in the mutator code;

DETAILED DESCRIPTION OF AN ILLUSTRATIVE EMBODIMENT

Figure 10:
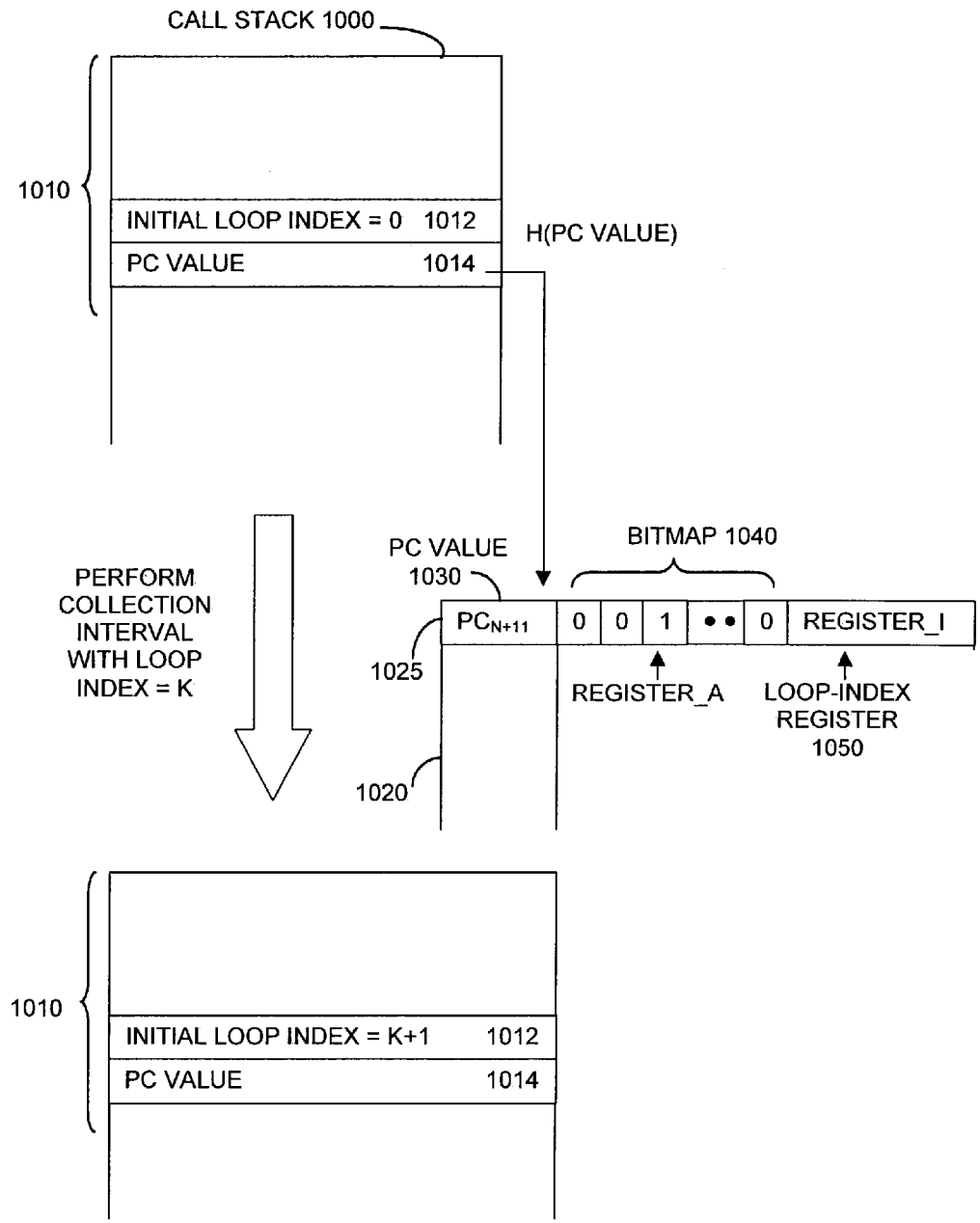
FIG. 10 is a block diagram of an exemplary bitmap that may be used by a garbage collector to determine which arrays contain reference values that were modified by instructions in FIG. 9's inner loop.

A. Deferring Write Barriers for an Inner Loop

As understood in the art, an array comprises an arrangement of memory elements that store values of a common type, such as integers, reference values, characters, etc. Typically, an array's elements are located in consecutive memory locations that span a contiguous region of memory. Further, the array elements are usually each assigned a corresponding index value through which they may be addressed. The notation a[i] is commonly used to denote the $i^{th}$ element of an array a. For instance, a[0] may denote the first element of an array a having N elements, and a[N–1] may denote the last.

The illustrative embodiment concerns arrays of reference values that may be modified by instructions in an "inner loop." As used herein, an inner loop is a loop in the mutator code that contains no other loops having instructions that modify array-reference values. Any loop that is not an inner loop is an "outer loop." Notably, an inner loop may be nested in one or more outer loops, or, alternatively, it may be a single loop that is not nested at all. Thus, while FIG. 8's exemplary inner loop 810 is nested within a single outer loop 800, those skilled in the art will appreciate that other inner loops may be nested differently. For sake of simplicity, the invention will be described below in terms of inner-loop implementations, thereby eliminating the possibility of reference modifications in the same array by instructions in different loops. However, those skilled in the art will understand that the inventive concepts may be extrapolated to non-inner-loop implementations as well.

Conventionally, a compiler emits a write barrier after each reference-modifying instruction in an inner loop. For instance, during execution of FIG. 8's exemplary inner is loop 810, a total of N write barriers would normally be executed by the mutator code—one write barrier after execution of the reference-modifying instruction 812 during each of the inner loop's N iterations.

In contrast, I have recognized that the number of write barriers executed in a mutator code can be reduced when reference-modifying instructions in an inner loop modify array references located in consecutive cards. More specifically, execution of write barriers corresponding to these modifications may be deferred until after the inner loop has completed, thereby enabling the mutator to execute the write barriers on a per-card basis as opposed to the typically lengthier per-modification basis conventionally employed. For example, if the inner loop 810 is repeated N=100 times, yet during execution of the 100 inner-loop iterations the instruction 812 only modifies array a's references located in three consecutive cards, then the mutator in the illustrative embodiment may execute three deferred write barriers corresponding to the modified cards instead of executing 100 write barriers corresponding to each reference modification made in the inner loop.

To reduce the number of write barriers executed in a mutator in the manner described above, a compiler generating the mutator code must first determine whether reference-modifying instructions in an inner loop modify an array's references located in consecutive cards. This determination will depend on the frequency with which inner-loop instructions modify references in the array as well as on the size of a card. Because inner loops are often implemented having a fixed step size k, and array-modifying instructions in an inner loop usually modify every k element in an array, the compiler's determination may be as simple as making sure the step size is less, e.g., by a factor of 2 or more, than the size of a card. As defined herein, the step size of a loop corresponds to a constant value by which a loop-index value is incremented each loop iteration. For instance, in FIG. 8 the inner loop's index i is incremented by 1 word each iteration ("i++"), so the step size for this loop equals 1 word. In the illustrative embodiments described hereinafter, loops will be assumed to increment a loop-index value by a step size equal to one, although those in the art will understand other step sizes may be employed in accordance with the teachings herein.

In general, the frequency with which reference-modifying inner-loop instructions modify an array's elements depends on a mathematical function of the loop's index value. For instance, if the inner loop's index value is i, then the array element a[f(i)] will typically be modified by the inner loop's execution, where f(i) is an arbitrary function of i. In addition, the loop-index value i is usually incremented from its initial value 10 by a fixed step size k, so the loop-index value during the n*th* loop iteration may be expressed as i=$i_o$+nk. Thus, based on the function f($i_o$+nk), the value of the step size k and the initial-loop index value 10, the compiler will often be able to identify a periodicity of array-reference modifications made by the inner-loop instructions. If the identified period is less, e.g., by a factor of 2 or more, than the size of a card, then the compiler may defer the instructions' corresponding write barriers as described herein. In sum, those skilled in the art will appreciate that the process by which the compiler determines whether array elements in consecutive cards are modified by inner loop instructions will generally be implementation-specific.

FIGS. 9A–B illustrate an exemplary pseudo-code representation of an inner loop located in a mutator method m. As shown, the inner loop is implemented by the instructions at lines N through N+11. Further, the inner loop's initial loop-index value equals zero (at line N+1), the loop's step size equals one (at line N+7) and a reference stored in an array element a[i] is modified every loop iteration (at line N+5). In other words, an array element a[n] is modified by the inner-loop's instructions during the loop's $n^{th}$ iteration. Therefore, the compiler can identify that the period in which the array a's elements are modified is less than a card size (i.e., the period equals one array element), so execution of the inner loop will modify at least one reference in consecutive cards spanned by the array a. In accordance with the illustrative embodiment, the compiler emits code at line N+13 through N+30 to implement a subsequent "write-barrier loop" that, when executed, performs a write barrier for every card spanned by the array a instead of performing a write barrier for every reference modification made in the inner loop, as conventionally done.

FIG. 9's write-barrier loop depicts one possible implementation for deferring write-barrier code to mark consecutive cards spanned by the array a. Before the write-barrier loop begins, an initial loop-index value is loaded into the loop-index register, register_i, by the instruction at line N+14. Notably, at line N+2, the initial value of the loop-index register was stored in a designated slot, slot_i. The instructions at lines N+17 through N+19 perform the operations of an exemplary write barrier that marks a card-table entry corresponding to the card containing the $i^{th}$ element of the array a. For each iteration of the write-barrier loop, the index i is incremented by the card size C (at line N+21), and the loop is repeated until the value of i exceeds the length of the array a. In this example, the write-barrier loop, having an initial loop-index register value equal to zero, executes a write barrier for array elements a[0], a[C], a[2C], etc., thereby executing one write barrier for each card spanned by the array a. In addition, because the array a may not necessarily begin at the beginning of a card, there may be situations where the write-barrier loop ends before marking the card in which the array a's last element is located. For this reason, execution of the code at lines N+27 through N+30 ensures a write barrier is performed corresponding to the last card spanned by the array.

Typically, every backwards branch instruction, such as FIG. 9's instruction at line N+11, corresponds to a possible safe point at which a garbage collector can interrupt the mutator's execution to perform a collection interval. A possible safe point is a logical stopping point in the mutator code where the current process or thread is in a known state, and where the compiler will have generated a stack map to identify the locations of references in the stack frames and registers. Other possible safe points besides backward branches may include instructions that execute call returns, allocate new memory, begin mutator methods, etc.

Therefore, a situation may arise where the collector interrupts the mutator at a possible safe point during execution of an inner loop that includes one or more reference-modifying instructions whose write barriers have been deferred, e.g., until a later write-barrier loop is executed. To perform its collection functions in this situation, the collector must identify which array references were modified by instructions in the inner loop without execution of corresponding write barriers. To that end, the collector may first identify which arrays contain references that were modified by inner-loop instructions, then subsequently determine which particular elements in these arrays were modified.

Illustratively, the collector identifies which arrays were modified by inner-loop instructions prior to its interrupting the inner loop at a given safe point by examining the contents of a compiler-created bitmap associated with the safe point. That is, at compile time the compiler may create a bitmap for each possible safe point in the inner loop to identify which arrays, if any, contain references that were modified by inner-loop instructions before the inner loop's execution reached the possible safe point. Illustratively, each bit in a bitmap is mapped one-to-one to a hardware register or stack-frame slot. A bit in the bitmap is set to a first value if its associated register or slot stores the memory location of an array having one or more references that were modified by inner-loop instructions without execution of corresponding write barriers. Otherwise, the value of a bit in a bitmap is set to a second value. Alternatively, each bit in a bitmap may be mapped to a value number associated with an array allocated in the heap.

Operationally, the bitmaps corresponding to possible safe points in an inner loop may be organized in a table. For example, when performing a collection interval, the garbage collector may first locate FIG. 10's call stack 1000 containing a stack frame 1010 associated with the interrupted method. Among other things, the frame 1010 includes a tslot 1014 that stores the program-counter (pc) value corresponding to the safe point at which the collector interrupted the mutator's execution. The collector may then locate a bitmap associated with this safe point in a table 1020, e.g., stored at a known location in memory. For purposes of illustration, the table 1020 is organized as a hash table whose one or more entries 1025 may be indexed by hashing the pc value stored in slot 1014. Each table entry correlates an inner-loop's program-counter value 1030 with a corresponding bitmap 1040 and a loop-index register 1050. In such a configuration, the table can contain bitmaps for possible safe points in multiple inner loops, even when the inner loops rely on different loop-index registers.

As shown, the entry 1025 corresponds to the possible safe point located at the backwards branch instruction (at line N+11) in FIG. 9's inner loop. Therefore, if the collector interrupts the inner loop at this possible safe point, the collector can use the result of hashing the pc value of the instruction at line N+11 as an index into the table 1020. Upon determining the pc value 1030 in the table matches the pc value of the backwards branch instruction (PCN+11), the collector can retrieve the entry's corresponding bitmap 1040 and the location of its loop-index value, e.g., stored in register_i. Since FIG. 9's inner loop only comprises one reference-modifying instruction (at line N+5) that modifies elements in an array a without corresponding write-barrier execution, all bits in the retrieved bitmap are equal to a first value "0," except for the bit corresponding to the register_a which stores the memory location of the array a. In this example, the bit corresponding to the register_a equals "1" to inform the collector that references were modified in the array a without execution of corresponding write barriers before the collector reached the safe point at line N+11.

While the retrieved bitmap 1040 alerts the collector as to which arrays contain references that have been modified by inner-loop instructions without execution of write barriers, the collector also must determine what range of array elements have been modified. Illustratively, the collector determines the range of modified array elements based on both the value of a "current" loop-index value ($i_{current}$), corresponding to the loop iteration in which the collector interrupted the mutator method, and based on the value of an "initial" loop-index value ($i_{initial}$), corresponding to the first inner-loop iteration performed since the last collection interval. The current loop-index value may be readily accessed by the collector through the inner-loop's loop-index register, e.g., FIG. 9's register_i, identified in the table 1020. Alternatively, the register (e.g., register_i) storing the current loop-index value may be identified by the collector through a value stored in a predetermined memory location, such as in a designated stack-frame slot.

The initial loop-index value may be stored in a predetermined memory location accessible to the collector, such as in a designated stack-frame slot. For instance, in the illustrated embodiment, a slot 1012 is added to the stack frame 1010 to store the initial loop-index value. The initial loop-index value will typically be initialized, e.g., by instructions in the mutator code, to equal zero. Thus, the collector may be configured to scan the array a, identified by the bitmap 1040 as having been modified by one or more inner-loop instructions, from $a[i_{initial}]$ to $a[i_{current}]$, where the values of $i_{initial}$ and $i_{current}$ are respectively the loop-index values stored in the slot 1012 and the register_i. Preferably, the collector performs the same operations that it would have performed had write barriers been executed for every card spanned over the range of array elements defined by the initial index value and current index value.

After the collector performs its collection functions, it may update the initial loop-index value stored in the slot 1012 to reflect the start of the next range of array elements that will be modified when the inner loop's execution resumes. To that end, the collector may overwrite the initial loop-index value stored in the slot 1012 to indicate the next value the loop-index value will be assigned when the inner loop's execution resumes. Suppose, for example, the current loop-index value equals k, and the next inner-loop iteration will correspond to a loop-index value equal to k+1 (i.e., the loop's step size equals one). Thus, the collector may store the value k+1 in the slot 1014 to ensure that in the event it interrupts the inner loop's execution again before the loop has completed, the collector will begin scanning array elements corresponding to array-reference modifications that occurred during or after the inner loop's $(k+1)^{th}$ iteration. In other words, by updating the value stored in the slot 1012 as described, the collector can set $i_{initial}$ to equal k+1 in case it performs another collection interval during the inner loop's execution. Notably, when the inner-loop step size is not equal to one, the initial value may be updated based on the loop-index value of the loop's next iteration. For instance, if the step size equals n, then the $(k+n)^{th}$ iteration is the next loop iteration after the $k^{th}$ iteration, so $i_{initial}$ would therefore be set equal to k+n.

B. Deferring Write Barriers for an Inner Loop Having a Plurality of Possible Safe Points As previously noted, a compiler generally chooses an inner loop's backwards branching instruction as a possible safe point where a garbage-collection interval may be performed. However, some inner loops may include additional instructions the compiler selects as possible safe points. In these cases, a collection interval may occur at an inner-loop safe point where some reference modifications have been made to array elements during the inner loop's current iteration while others have not. Thus, when write barriers corresponding to the inner-loop's array-reference modifications have been deferred, the collector may have to identify which arrays were modified during the inner-loop's current iteration and which arrays were last modified during the loop's previous iteration, so the collector can scan the appropriate ranges of array elements during its collection interval. By way of example, FIGS. 11A–B and 12 described below illustrate one such scenario in more detail.

FIGS. 11A–B illustrate a mutator method m comprising an inner loop that stores a reference to a newly allocated object into each element of an array a (lines N+4 through N+6), and likewise stores a reference to a different allocated object into each element of an array b (lines N+7 through N+9). Write barriers corresponding to the reference-modifying instructions at lines N+6 and N+9 are deferred until after the inner loop is completed. Specifically, a write-barrier loop is implemented at lines N+17 through N+42 that executes one write barrier for each card spanned by the arrays a and b.

Suppose the compiler designates the CALL instructions at lines N+5 and N+8 and the backwards branch instruction at line N+15 as possible safe points in the method m. Therefore, a garbage collector could suspend the inner loop at any of these three possible safe points. As will be shown below, the possible safe point at which the collector interrupts the inner loop's execution will affect the range of elements in the arrays a and b that the collector must scan during its collection interval. For purposes of discussion, assume the collector interrupts FIG. 11's inner loop during its $i^{th}$ loop iteration (i.e., the loop-index value i being stored in register_i).

If the collector interrupts the inner loop at the CALL instruction at line N+5, neither of the reference-modifying instructions at lines N+6 and N+9 will have been executed in the current iteration of the inner loop. In other words, at this safe point neither of the array elements a[i] nor b[i] will have been modified by inner-loop instructions, so the last array modifications made in arrays a and b correspond to the previous loop-index value, i−1. Accordingly, even though the current loop index equals i, the collector only scans elements of each array corresponding to an initial index value (e.g., a[0] and b[0]) until it reaches the array elements a[i−1] and b[i−1].

However, if instead the collector were to interrupt the inner loop at line N+8's CALL instruction, the inner loop will have executed the reference-modifying instruction at line N+6 based on the current loop-index value i, whereas the reference-modifying instruction at line N+9 will not have been executed in the current loop iteration. In this case, the last array elements modified by the instructions at lines N+6 and N+9 respectively correspond to a[i] and b[i−1]. Thus, while the collector may scan elements of the array a in the range of a[0] to a[i], the collector only needs to scan array b's elements from b[0] to b[i−1].

Lastly, when the collector interrupts the inner loop at line N+15's backwards branching instruction, both the inner loop's reference-modifying instructions will have been executed based on the current loop-index value i, so the last modified array elements correspond to a[i] and b[i]. In this case, the collector scans both the arrays a and b from elements corresponding to the initial loop-index value (e.g., a[0] and b[0]) up to the elements a[i] and b[i] corresponding to the $i^{th}$ index value.

As shown above, the range of array elements scanned by the collector differs depending on whether the array was last modified by reference-modifying instructions in the current or previous inner-loop iteration. Thus, at compile time a compiler may create separate bitmaps to notify the collector which arrays were last modified in the current and previous inner-loop iterations. More specifically, for each possible safe point in an inner loop, the compiler may create a "current index" bitmap that identifies which arrays were modified in the current iteration before the loop's execution reached the possible safe point. Similarly, a "previous index" bitmap may be created for each possible inner-loop safe point to identify which arrays were not yet modified by instructions in the current inner-loop iteration, and thus were last modified during the inner-loop's previous iteration. The bitmaps may be organized in a table, such as FIG. 12's table 1220, and stored somewhere accessible to the garbage collector, e.g., in a meta-data data structure associated with the method containing the inner loop.

In operation, when performing a collection interval at one of the possible safe points in FIG. 11's inner loop, a garbage collector may first locate a call stack 1200 containing a stack frame 1210 associated with the method m. The collector may then access the table 1220 and index an entry in the table based on the program-counter (pc) value, e.g., stored in a stack frame 1214, at which it interrupted the method. For purposes of illustration, the table is configured as a hash table comprising entries 1222, 1224 and 1226 respectively corresponding to the possible safe points located at lines N+5, N+8 and N+15 in FIG. 11. Each of the table entries associates a safe point's program counter value 1230 with a current-index bitmap 1240, a previous-index bitmap 1250 and a loop-index register 1260. In such a configuration, the table 1220 can contain pairs of current-index and previous-index bitmaps for possible safe points in multiple inner loops, even when the inner loops rely on different loop-index registers. As shown, the collector uses the result of hashing the pc value of the safe-point instruction where it interrupted the inner loop as an index into the table 1220. Upon locating an entry whose corresponding pc value matches the pc value of the safe-point instruction, the collector retrieves the entry's corresponding bitmaps 1240 and 1250. Each bit in the retrieved bitmaps is mapped one-to-one to a hardware register or stack-frame slot. Preferably, the $k^{th}$ bit in the current-index bitmap is mapped to the same register as the $k^{th}$ bit in the previous-index bitmap. A bit in each of the bitmaps is assigned a first value (e.g., "1") if it corresponds to a register or slot storing the memory address of an array that has been modified by reference-modifying instructions in the inner loop. Otherwise, the value of a bit in a bitmap is assigned a second value (e.g., "0"). Alternatively, bits stored in each bitmap may be mapped to value numbers associated with arrays allocated in the heap.

During its collection interval, the collector scans modified arrays identified by the current-index bitmap 1240 from an initial array element to the array element corresponding to the current loop-index value i, e.g., stored in FIG. 11's register_i. In contrast, the collector scans modified arrays identified by the previous-index bitmap 1250 from the initial array element to the array element corresponding to the previous loop-index value i−1.

For example, if the collector interrupts FIG. 11's inner-loop at the possible safe point at line N+7, the safe point's current index bitmap 1240 indicates the array a, having its memory location stored in register_a, was modified in the current inner-loop iteration. Thus, the collector only needs to scan elements of the array a from an initial array element (e.g., a[0]) to the array element (e.g., a[i]) corresponding to the current loop-index value. However, the safe point's previous index bitmap 1250 indicates the array b, having its memory location stored in register_b, was last modified in the previous inner-loop iteration. Therefore, the collector scans the array b from the initial array element (e.g., b[0]) to the array element (e.g., b[i−1]) corresponding to the previous loop-index value. Preferably, the collector performs the same operations that it would have performed had write barriers been executed for every card spanned over the range of array elements it scanned in the arrays a and b.

Notably, the initial array element scanned by the collector is the same when the collector relies on either of the bitmaps 1240 and 1250. The initial value may be determined from an initial loop-index value stored, e.g. by one or more previously executed mutator instructions, in a predetermined memory location accessible to the collector, such as in a designated stack-frame slot. For instance, a slot 1212 is added to the stack frame 1210 to store the initial loop-index value. The initial loop-index value will typically be initialized, e.g., by instructions in the mutator code, to equal its initial value.

After the collector performs its collection functions, it may overwrite the initial loop-index value stored in slot 1212 to indicate the next value the loop-index value will be assigned when the inner loop's execution resumes. Suppose, for example, the current loop-index value equals k and the loop's step size equals one, so the next inner-loop iteration will correspond to a loop-index value equal to k+1. Thus, the collector may store the value k+1 in the slot 1212 to ensure that in the event it interrupts the inner loop's execution again before the loop has completed, the collector will begin scanning array elements corresponding to array-reference modifications that occurred during or after the inner loop's $(k+1)^{th}$ iteration.

Figure 12:
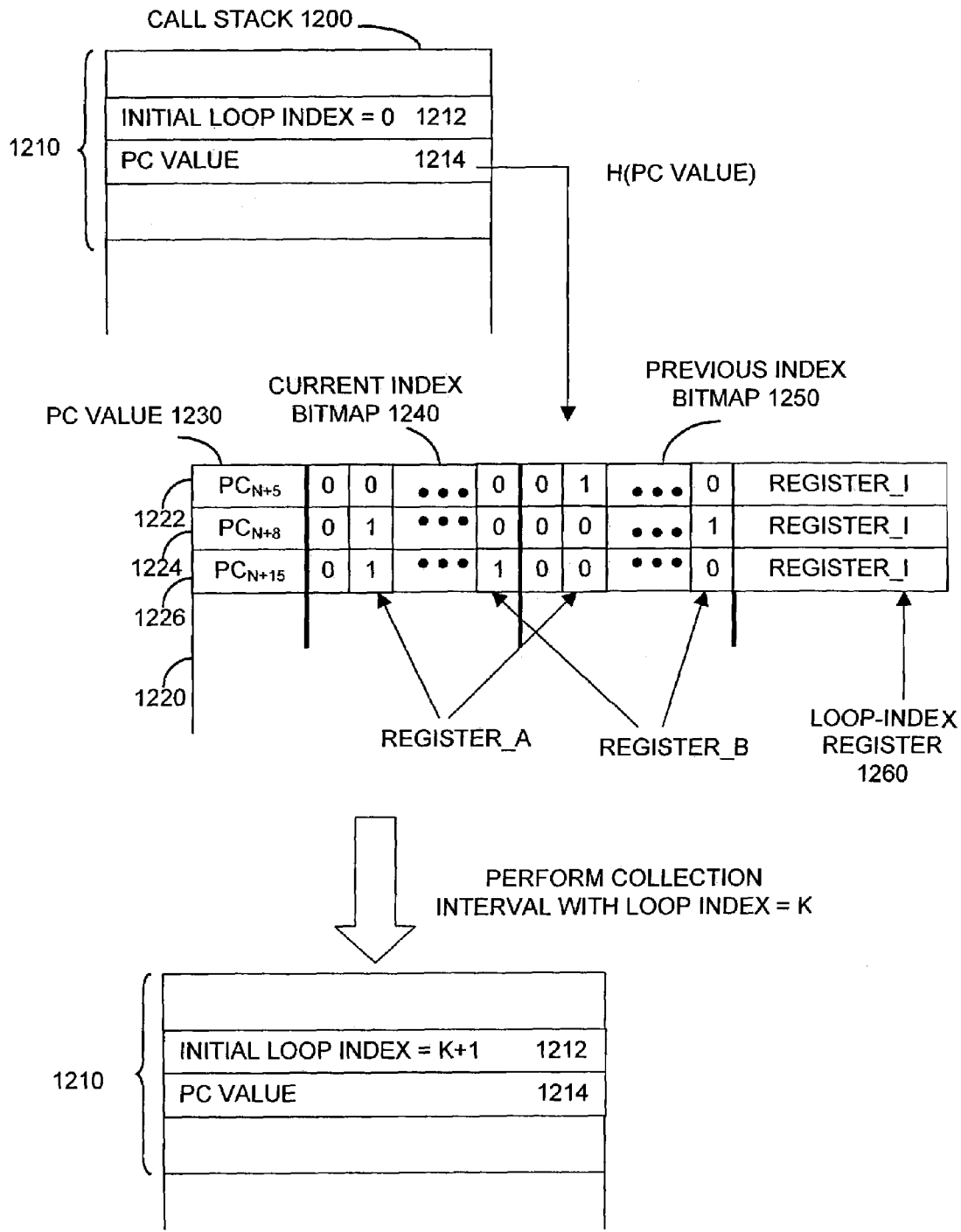
FIG. 12 is a block diagram of exemplary bitmaps that may be used by a garbage collector to determine which arrays contain reference values that were modified by instructions in FIG. 11's inner loop.

Notably, those skilled in the art will appreciate that the initial-loop index stored in the slot 1212 may equal the current loop-index value, as opposed to the next iteration's loop-index value (as shown in FIG. 12), in the event that an array modified before the collection interval is modified later in the same inner-loop iteration after the collection interval. For example, suppose the array elements a[i] and b[i] are modified both before and after the collector interrupts the method m during the loop interval k. In this case, the initial-loop value stored in slot 1212 equals k rather than k+1 since the next time the collector interrupts the inner loop it will need to be apprised of the later reference modifications during the loop interval k. In addition, it is also contemplated that each array may be associated with its own initial loop-index value, so multiple stack-frame slots may be designated in the stack frame 1210 for storing these initial values. For instance, the arrays a and b may be associated with different stack-frame slots storing their respective initial loop-index values.

C. Conclusion

The foregoing has been a detailed description of an illustrative embodiment of the invention. Various modifications and additions can be made without departing from the spirit and scope of the invention. For example, the bitmaps described herein may be stored in other data structures, such as in lists, heaps, etc., other than the hash tables shown. In addition, while the bitmaps in the illustrative embodiment map bits to registers on a one-to-one basis, they may also map one or more bits to other memory locations that store an array's memory location, such as a stack-frame slot. Further, the first and second values stored in the bitmaps need not equal "0" and "1" as described in the exemplary bitmaps. Also, those skilled in the art will understand that the described inventive concepts may also be embodied by other implementations besides those shown in FIG. 9's and FIG. 11's exemplary pseudo-code representations. For example, a write-barrier loop does not have to be situated directly after its associated inner loop, and instead may be located at some later point in the mutator code.

As previously noted, the garbage collector may be configured to access tables, such as the tables 1020 and 1220, to identify which register contains the current loop-index value. In the case where the invention is not limited to inner-loop implementations, an array may be modified by instructions in more than one loop. Thus, it is contemplated that the collector may access a data structure, e.g., previously constructed by the compiler, that identifies the location of the current loop-index values corresponding to loops that modify one or more arrays' references.

Figure 13:
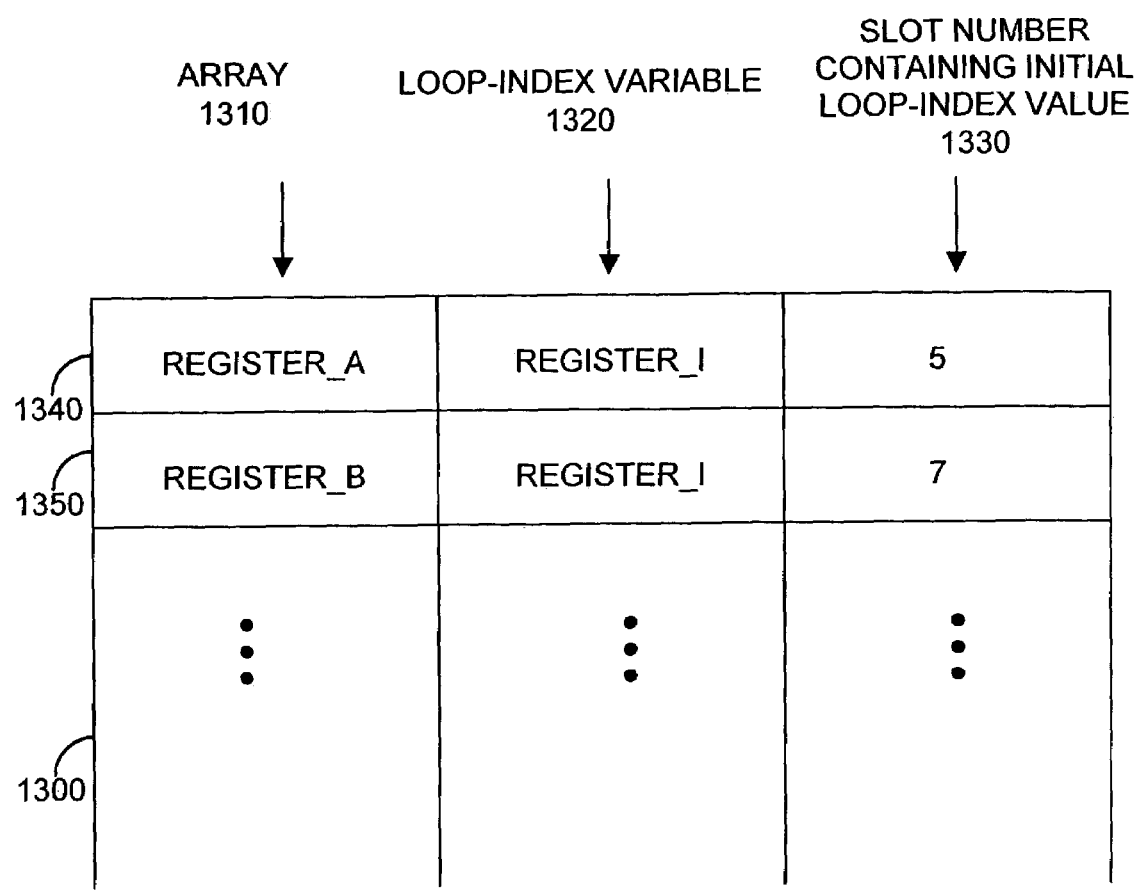
FIG. 13 is a block diagram of an exemplary data structure, accessible to a garbage collector, that correlates a modified array with an associated loop-index variable and an associated stack-frame slot storing the index variable's initial value.

For instance, FIG. 13 illustrates an exemplary table 1300 that correlates a modified array 1310 with an associated loop-index variable 1320 and an associated stack-frame slot 1330 storing the index variable's initial value. As shown, the table entry 1330 indicates the register_a stores the address of an array a, whose elements are modified by instructions in a loop having a loop-index value stored in register_i. Furthermore, the entry 1330 indicates that slot 5 stores the initial loop-index value corresponding to the first reference modification made in the array a since the last collection interval. Likewise, the table entry 1340 indicates the register_b stores the address of an array b which is also modified by the loop having a loop-index variable stored in register_i. However, the entry 1340 indicates the initial loop-index variable for the array b is stored in slot 7.

It is expressly contemplated that the teachings of this invention can be implemented as software, including a computer-readable medium having program instructions executing on a computer, hardware, firmware, or any combination thereof. The software may be embodied as electromagnetic signals by which the computer instructions can be communicated. Accordingly this description is meant to be taken only by way of example and not to otherwise limit the scope of the invention.

What is claimed is:

1. A computer comprising a processor for compiling source code that specifies operation of a mutator, which includes a loop including at least one reference-modifying instruction, into object code for execution by a computer system, which includes a memory of which at least a portion is logically partitioned into one or more cards, wherein the processor executes a set of instructions to perform:

(A) determining whether execution of the loop included in the mutator results in modifications, by the at least one reference-modifying instruction included in the loop, of at least one reference within each card spanned by an array of references, wherein the at least one reference is stored in the array of references and the computer system includes a garbage collector that relies on the mutator's execution of write-barrier code to keep track of at least some reference modifications of the array of references;

(B) deferring, in response to determining that execution of the loop results in the modifications of the at least one reference within each card spanned by the array of references, emission of write-barrier code corresponding to the modifications of the at least one reference within each card spanned by the array of references;

(C) emitting write-barrier code that executes subsequent to the execution of the object code implementing the loop, wherein write-barrier code executes a write barrier corresponding to each card spanned by the array of references; and (D) providing, in response to determining that execution of the loop results in the modifications of the at least one reference within each card spanned by the array of references, a data structure containing an indication of a location that stores the memory address of the array of references, the data structure being accessible to the garbage collector.

2. The computer of to claim 1, wherein the step of providing further includes: generating at least one bitmap having a bit that is mapped to a memory location associated with the array of references, where the bit is assigned a value that indicates to the garbage collector that the array of references is modified by the at least one reference-modifying instruction in the loop.

3. The wherein the processor executes a set of instructions to perform: claim 1, further comprising: emitting code that stores an initial loop-index value in a slot of a stack frame associated with a method containing the loop.

4. The computer of claim 2, wherein the step of generating at least one bitmap further comprises: generating a current index bitmap and a previous index bitmap for each possible safe point in the loop, where both generated bitmaps include a bit that is mapped to a memory location associated with the array of references.

5. The computer of claim 4, wherein in the current index bitmap, the bit mapped to the memory location associated with the array of references is assigned a first value if the array of references is modified before the loop reaches the possible safe point corresponding to the current index bitmap, otherwise the bit is assigned a second value.

6. The computer of claim 4, wherein in the previous index bitmap, the bit mapped to the memory location associated with the array of references is assigned a first value if the array of references is not modified before the loop reaches the possible safe point corresponding to the previous index bitmap, otherwise the bit is assigned a second value.

7. The computer of claim 1, wherein the loop is an inner loop.

* * * * *